United States Patent Office 3,246,040
Patented Apr. 12, 1966

---

3,246,040
DI(ALKYLTHIO)ETHER
Walter Reifschneider, Midland, Mich., assignor to The Dow Chemical Company, Midland, Mich., a corporation of Delaware
No Drawing. Filed June 17, 1963, Ser. No. 288,509
7 Claims. (Cl. 260—609)

This application is a continuation-in-part of my copending application Serial Number 205,514, filed June 27, 1962.

The present invention is directed to thioethers and in particular is directed to the novel thioether corresponding to the formula

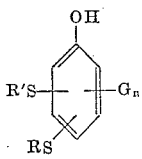

wherein each of R and R' is independently lower alkyl, G is halo or nitro, and $n$ is an integer of from 0 to 3, both inclusive.

The novel compounds are colorless to yellow crystalline solids appearing white in mass, slightly soluble in water and readily soluble in various common organic solvents such as lower alkanols, benzene and the like. The compounds are useful as pesticides; as inhibitors of the germination of fungus spores, they are effective fungistats. They are also useful as intermediates in the preparation of biologically active materials such as organic phosphates.

The compounds are prepared in various ways of which three are preferred. The first is a two-step process which comprises the steps of causing a reaction between a dihalophenol compound corresponding to the formula

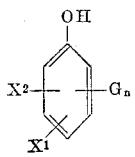

wherein $X^1$ and $X^2$ represent halogens of different molecular weights and successive proportions of mercaptan of the formulae RSH and R'SH or the alkali metal or cuprous salts thereof. During the reaction to prepare the present compounds, a mercaptan first reacts at the site of the halogen of higher molecular weight, and thereafter, further mercaptan reacts at the site of the halogen of lower molecular weight. Thus, either lower alkyl thio radical can be introduced first by choice of halophenol compound. For efficiency, the starting reactants should be employed in equimolecular proportions, or preferably, with each mercaptan in slight excess. However, other proportions may be employed if desired, and unconsumed starting material of whatever identity may, if desired, be recycled into further synthesis process.

The reaction goes forward at temperatures over a wide range such as 20° to 350° C., but initiates most readily when heated to a temperature somewhat higher than room temperature, preferably 100° to 250° C.; under these conditions the reaction is, in general, exothermic and goes forward to completion with good yield calculated upon the basis of consumed starting material. Hydrogen halide of reaction is evolved when mercaptan is employed, and means for its orderly disposal are advantageously provided.

Typically, in the preparation of the compounds of the present invention in this first method, reaction between a mercaptan starting material and the aromatic halide starting material will initiate and go forward only when there are employed, as catalytic agents, simultaneously, both a catalytic amount of a source of cuprous ion and a nitrogenous base. Thus, in the preparation of many, and probably all of the present compounds, the employment of such catalyst is essential and critical, although the weight is not critical. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed amount is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary, secondary, or tertiary aliphatic or aromatic amine or a nitrogen heterocycle wherein the nitrogen acts, or is capable of acting, as a basic substance. If desired, the nitrogenous base may be a naturally liquid substance which is employed as a reaction medium. Otherwise, such base is dissolved in inert liquid reaction medium, such as an aliphatic or aromatic hydrocarbon.

On laboratory scale, it is preferred to employ the nitrogenous base catalyst substance in sufficient excess that portions of it may also act as hydrogen halide acceptor and yet further portions may continue to function, unreacted, in the necessary catalytic manner.

In carrying out the present reaction to prepare the compounds of the present invention, the halophenol and a chosen mercaptan are intimately mixed and blended, and reacted in that order which causes the thioalkyl groups to seek their assigned ring positions, as hereinbefore described. The mixture is thereafter heated to a temperature at which reaction takes place promptly. In one convenient manner of practicing the present method each mercaptan is caused to react by heating the reaction mixture to a reaction temperature; the reaction temperature may be the reflux temperature of the liquid reaction medium. In this situation, heating may be continued at the boiling temperature of the reaction mixture and under reflux for a period of time to carry each step of the reaction to completion.

The mercaptans are typically gases or liquids. They may be bubbled into the reaction mixture as gases: or the alkali metal or cuprous mercaptides may be used, and added as solids. Liquids are added in conventional procedures.

Not all the compounds of the present invention can be prepared in the foregoing method, although many of them can, and the method is often preferred for convenience. The compounds of the present invention, including those which cannot be prepared in the foregoing method can all be prepared, conveniently and in good yield, by either of the two following second and third methods, which are preferred for their versatility.

In the second method of preparation of compounds of the present invention, a hydroxy alkylthiophenyl thiocyanate of the formula

is caused to react with an alcohol of the formula

ROH in the presence of a base. In the general formulae of the present method, the cymbols X, $n$, R' and R have the values hereinbefore defined. In the present process, the alcohol and (thiocyanato)phenol compound react together in equimolecular amounts, but the reaction is favored by the employment of excess alcohol. Moreover, when such alcohol is of appropriate identity, it may be employed in excess as a liquid reaction medium. On the other hand, if desired, such alcohol may be employed in an amount less than that equimolecular with the (thiocyanato)phenol compound, and therefore in a limiting amount. In carrying out the method, the alcohol and (thiocyanato) phenol compound, dissolved together in further portions of alcohol or in an inert liquid reaction medium which may be tetrahydrofuran or a dialkyl ether, are added in a slow stream to a solvent solution of base. The solvent employed to dissolve the base should desirably be an alcohol of the same identity as that employed also as reactant and solvent in the other solution or should be an inert liquid reaction medium such as a dialkyl ether, tetrahydrofuran or the like. Desirably but not necessarily it should be of volatility distinctly different from that of the product. The base to be employed can be an alkali metal alkoxide, an alkali metal hydroxide, a tertiary amine or other strongly basic amine or the like. Desirably, an amount equivalent to 1 to 3 times the molecular proportion of (thiocyanato)phenol of the said base should be present in the solution thereof.

Upon the completion of the combining of the reactants, the resulting reaction mixture is heated at a reaction temperature, typically between room temperature and 200° C., preferably between about 50° and 150° C. for a period of time such as from about 5 minutes to about 100 hours, and typically from about 20 minutes to about 6 hours to carry the reaction to a desired degree of completion. Product is formed in at least small amounts immediately upon the contacting together of all the components of the reaction mixture. However, especially at lower temperatures, yields obtained tend to be quite low after only short reaction periods. When yield more clearly quantitative is desired, heating should be employed or an extended reaction time, preferably with stirring, should be provided.

When the reaction has gone forward to the desired degree, typically to the exhaustion of a limiting reactant, excess liquid reaction medium can be removed by, for example, vaporization under atmospheric or sub-atmospheric pressure, and the resulting product residue permitted spontaneously to cool to room temperature. The resulting residue may then be poured into a mixture of ice and concentrated hydrochloric acid whereby to neutralize any excess of basic material and to permit, typically, separation of product as a solid of very low solubility in water. From this point forward, routine purification procedures applicable in all the syntheses of the present compounds can be employed.

In a third process for the preparation of any of the products of the present invention, a hydroxy alkylthiophenyl thiocyanate of the formula

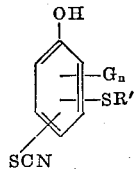

is caused to react with a halocarbon compound of the formula

wherein G' represents halogen, and R has the value hereinbefore defined. The reaction goes forward in the presence of a base, and desirably in an inert liquid reaction medium. Alternatively, tetrahydrofuran, a dialkyl ether, an alcohol or water or other inert liquid reaction medium may be employed. The reaction goes forward smoothly, obtains good yields, and employs starting materials efficiently. It goes forward at a good rate at room temperature, usually reaching completion in from about 2 to about 4 hours, depending upon quantities of reactants employed, temperature, whether stirring is employed and other factors. At lower temperature, times of up to 200 hours may be desired to obtain maximum yield, whereas at reflux temperature of solvent, typically a temperature between 50 and 150° C., much shorter times, such as 20 minutes to an hour or 2 hours give good results. Some of the desired product is formed immediately upon the contacting together of the reactants and when small yield of products in the presence of relatively large amounts of unconsumed starting material is satisfactory, very short reaction times can be employed and the resulting reaction mixture employed in crude form shortly after the initiation of the reaction to obtain at least minimum benefits according to the present invention. When it is desired to obtain product in maximum yield, the reaction is permitted to go forward to a desired degree of completion or to its natural termination point which is usually the exhaustion of a limiting reactant, and a crude reaction mixture thereof subsequently employed. When it is desired to obtain products in highly purified form, the reaction mixture is warmed under atmospheric or subatmospheric pressure, to vaporize and remove liquid reaction medium and the resulting product-containing residue is purified in routine manners which apply alike to all the methods of synthesis by which the present products are advantageously prepared.

Upon completion of the reaction in any of the syntheses, the compound product of the present invention can be purified in any of the various manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms in which the desired product is a solvent-soluble fraction. Representative solvents include diethyl ether, chlorinated hydrocarbons, and benzene. The said precipitate is extracted with solvent, the solvent extract dried over an inert drying agent such as, for example, anhydrous sodium sulfate or the like; the solvent vaporized and removed and the remaining product chilled or otherwise induced to crystallize and, if desired, recrystallized from a solvent such as benzene, lower aliphatic hydrocarbons, methylcyclohexane, or a lower alkanol. In another manner, the reaction mixture is fractionally distilled to vaporize and remove solvent and, in a relatively narrow boiling range, product.

When production of the present compound is to be carried out on an industrial scale, various other methods of separation and purification may be preferred, including, for example, centrifugation, decantation, vacuum distillation, and the like.

The following examples, without more, will enable those skilled in the art to practice the present invention:

*Example 1*

A reaction mixture is prepared, consisting of 20.5 grams (0.1 mole) of 3-chloro-4-bromophenol, 16 grams of cuprous oxide (technical grade) and 7 grams (approximately 0.1 mole) of sodium methyl mercaptide dispersed in a mixture consisting of 110 milliliters quinoline and 15 milliliters pyridine. The resulting reaction mixture is placed in a flask under reflux. In this situation, the reaction mixture is heated at its reflux temperature (a pot temperature between approximately 180 to 200° C.) for 6 hours to carry the reaction to completion. Thereafter, there is added 62.1 grams (about 0.1 mole) ethyl mercaptan. Heating is continued for 6 hours further. The resulting mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous sodium sulfate which also neutralizes remaining traces of acidic substances; the resulting liquid is warmed to vaporize and remove ether solvent and obtain a residual oil. This oil crystallizes upon standing; the crystals are taken up in hot ethanol and precipitated therefrom as the ethanol cools, to obtain a 3-(ethylthio)-4-(methylthio)phenol product as white crystals melting at 63.5°–64.5° C.

*Example 2*

A first reactant mixture is prepared consisting of 165 grams 4-hydroxy-3-(ethylthio)phenyl thiocyanate dispersed in a half liter ethanol. A second reactant mixture is prepared consisting of 68 grams sodium ethoxide (prepared in situ by the addition of 23 grams metallic sodium) in ethanol, the total amount of ethanol being approximately 150 milliliters.

The said first and second liquid reactant mixtures are slowly mixed together with stirring, and the resulting reaction mixture placed in suitable apparatus and heated under reflux for two hours, to carry the reaction to completion. At the end of two hours reaction time, the resulting reaction mixture is cooled to approximately room temperature, and poured into a mixture of ice and concentrated hydrochloric acid. Ice melts, and excess alkaline substances are neutralized, and there forms in the resulting aqueous solution an insoluble product layer. This layer is removed in a separatory funnel, taken up in diethyl ether, dried over anhydrous sodium sulfate, and fractionally distilled to obtain a 2,4-bis(ethylthio)phenol product as a colorless oil boiling at 101–104° C. under a pressure of 0.7 millimeter mercury absolute.

*Example 3*

In procedures essentially the same as those of Example 2, foregoing, wherein the starting phenol compound is 4-hydroxy-5-chloro-2-ethylthiophenyl thiocyanate, there is obtained a 2-chloro-4,5-bis(ethylthio)phenol as a white crystalline solid.

Also, when employing 5-ethylthio-3-hydroxy-6-iodo phenyl thiocyanate, there is obtained a 3,5-bis(ethylthio)-4-iodo phenol product as a white crystalline solid.

*Example 4.—3-(ethylthio)-4-(methylthio)phenol*

A first reactant mixture is prepared by dispersing 151 grams (1.0 mole) 5-hydroxy-2-methylthiophenyl thiocyanate and 65 grams chloro-ethane in 500 milliliters tetrahydrofuran. A second reactant mixture is prepared by dispersing 44 grams (3 moles) sodium hydroxide in 200 milliliters methanol.

The two reactant mixtures are combined slowly portionwise and with stirring to obtain a reaction mixture. The resulting reaction mixture is thereafter heated at its boiling temperature, 60° to 70° C., for two hours to carry the reaction to completion.

At the end of the reaction time, there is obtained a methanol dispersion of 3-(ethylthio)-4-(methylthio)phenol product. The product solution is poured quickly into a mixture of concentrated hydrochloric acid and ice. The ice melts and a pale solid product appears in the aqueous dispersion. The aqueous mixture is filtered, solid product being retained as residue on the filter. The product is recrystallized from methylcyclohexane to obtain a 3-(ethylthio)-4-(methylthio)phenol product as a white crystalline solid melting at 63.5–64.5° C. The product has a molecular weight of 168.3.

*Example 5*

The present example is carried out in all procedures as was the foregoing except that there is employed, as chlorocarbon reactant, a molar amount (120 grams) α-chlorohexane. As a result of these operations there is obtained a 4-(n-hexylthio)-3-(ethylthio)phenol product as a white crystalline solid of molecular weight 258.72.

*Example 6*

In procedures essentially the same as those foregoing, employing as starting thiocyanate reactant 4-hydroxy-3-methylthio-5-nitrophenyl thiocyanate (a pale yellow crystalline solid) and isopropanol, there is obtained a 4-isopropylthio - 2 - methylthio - 6 - nitrophenol product. The product is a pale yellow crystalline solid.

The compounds are useful as fungicides for the control of plant diseases. The application of a water dispersion containing 75 parts of the compound of Example 7 as sole toxicant per million parts by weight of resulting aqueous dispersion to a group of young tomato plants resulted in commercially satisfactory protection of the plants from subsequent inoculation with live spores of tomato late blight.

The compounds are especially useful in the preparation of derivative esters with acids of phosphorus and with carbamic and substituted carbamic acids to obtain biologically active substances.

Also the compounds are selecitve herbicides, insecticides for the control of flies, and acaricides. They are of relatively low oral toxicity to warm-blooded animals.

I claim:
1. Compound of the formula

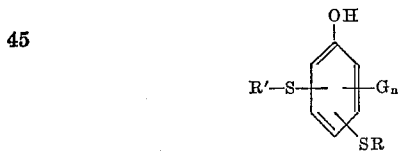

wherein each of R and R' is independently lower alkyl, G is a member of the group consisting of halo and nitro, and $n$ is an integer of from 0 to 3, both inclusive.
2. 3-(ethylthio)-4-(methylthio)phenol.
3. 3,4-bis(ethylthio)phenol.
4. 2-chloro-4,5-bis(ethylthio)phenol.
5. 3,5-mis(ethylthio)-4-iodophenol.
6. 4-(n-hexylthio)-3-(ethylthio)phenol.
7. 4-isopropylthio-2-methylthio-6-nitrophenol.

No references cited.

CHARLES B. PARKER, *Primary Examiner.*